United States Patent [19]

Tsunoda et al.

[11] 4,310,825
[45] Jan. 12, 1982

[54] VOICE WARNING SYSTEM FOR AN AUTOMOTIVE VEHICLE

[75] Inventors: Masakazu Tsunoda, Fujisawa; Teruo Kawasaki, Yokohama, both of Japan

[73] Assignee: Nissan Motor Company Limited, Kanagawa, Japan

[21] Appl. No.: 199,708

[22] Filed: Oct. 23, 1980

[30] Foreign Application Priority Data

Oct. 24, 1979 [JP] Japan .............................. 54-146310[U]

[51] Int. Cl.[3] .............................................. G08B 19/00
[52] U.S. Cl. ................................ 340/52 F; 340/27 R; 179/1 SM
[58] Field of Search ................ 340/52 R, 52 F, 27 R; 179/1 SM, 1 SA

[56] References Cited

U.S. PATENT DOCUMENTS

| | | | |
|---|---|---|---|
| 3,581,014 | 5/1971 | Vogel | 340/27 R |
| 3,870,818 | 3/1975 | Barton et al. | 340/52 F |
| 3,879,704 | 4/1975 | Noji | 340/52 F |

*Primary Examiner*—Alvin H. Waring
*Attorney, Agent, or Firm*—Lowe, King, Price & Becker

[57] ABSTRACT

A voice warning system for an automotive vehicle wherein a repeat switch is provided so that voice warning information is indicated to the driver repeatedly whenever the repeat switch is depressed. Accordingly, even if the driver fails to notice the information, it is possible to hear the information again. The system thus improved comprises a repeat switch, a memory, and a gate circuit, in addition to a voice warning system for an automotive vehicle.

2 Claims, 3 Drawing Figures

VOICE WARNING SYSTEM FOR AN AUTOMOTIVE VEHICLE

BACKGROUND OF THE INVENTION

1. Field of the Invention

The present invention relates generally to a voice warning system for an automotive vehicle, and more particularly to a repeat switch provided for the voice warning system whereby the driver can hear the voice information repeatedly, if necessary.

2. Description of the Prior Art

Heretofore, as means for informing the driver of various vehicle operating conditions, there have been used various meters with pointers and various warning indication lamps. In addition, recently, there have appeared vehicles in which a computer is mounted so as to display digitally various vehicle operating conditions whenever the driver depresses pushbuttons to obtain the vehicle conditions. That is to say, in these devices, the driver is informed of the vehicle conditions through the sense of sight. On the other hand, as devices by which the driver is informed through the sense of hearing, there have been used various devices which produce a simple warning sound such as buzzer or chime.

Although these conventional warning devices which depend upon the sense of sight have the advantage that a number of vehicle conditions can be displayed at the same time, it is comparatively difficult to attract the driver's attention and to give the driver complicated information. Also, in the case of the conventional devices which depend upon the sense of hearing, it is difficult to inform the driver of different items of information, even if the device can attract the driver's attention.

Therefore, recently, various voice warning systems have come to be used for vehicles by which the driver can hear various vehicle operating conditions such as the distance traveled detected by a trip meter, the amount of fuel consumed and so on, in voice form.

When such a device as described above is used for an automotive vehicle, it is possible to attract the driver's attention well and also to inform the driver of relatively complicated vehicle operating conditions without any difficulties. However, since various information is indicated to the driver in voice form, the driver may sometimes fail to hear the information correctly, because of noise generated from the engine or carelessness.

BRIEF SUMMARY OF THE INVENTION

With these problems in mind therefore, it is the primary object of the present invention to provide a voice warning system for an automotive vehicle in which a repeat switch is provided so as to inform the driver of voice warning message repeatedly even if the driver fails to notice or hear the information.

To achieve the above-mentioned object, the voice warning system of the present invention comprises a memory for storing a voice designation signal temporarily, a gate circuit for controlling the signal, and a repeat switch, in addition to a voice warning system for an automotive vehicle.

BRIEF DESCRIPTION OF THE DRAWINGS

The features and advantage of the voice warning system of the present invention will be more clearly appreciated from the following description taken in conjunction with the accompanying drawings in which like reference numerals designate corresponding elements, and in which.

DETAILED DESCRIPTION OF THE PREFERRED EMBODIMENTS

Figure 1:
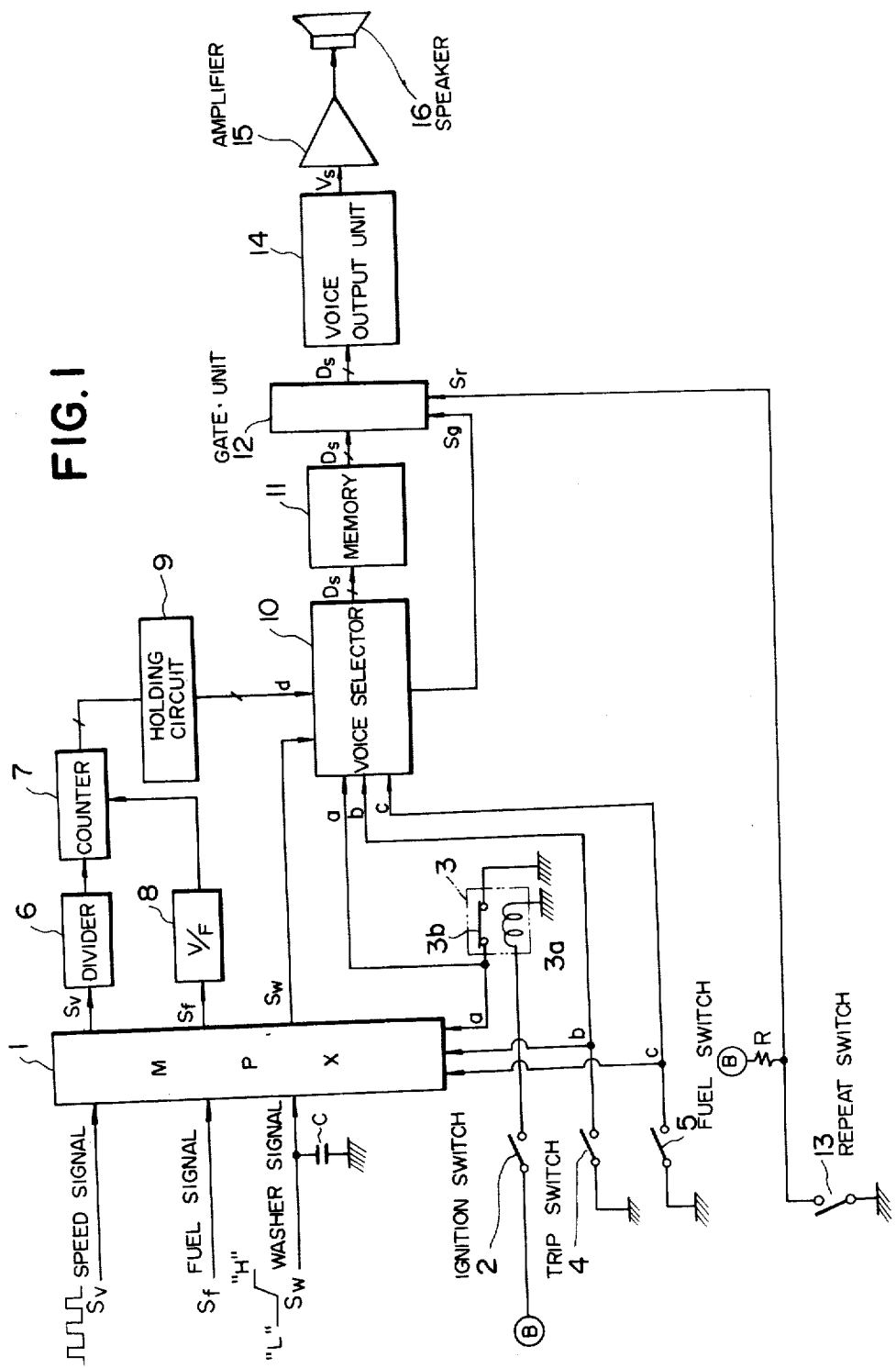
FIG. 1 is a schematic block diagram of an embodiment of the present invention.

Reference is now made to the figures, and more specifically to FIG. 1, wherein a first preferred embodiment of the present invention is illustrated.

In FIG. 1, the numeral 1 denotes a multiplexer to which are inputted various signals for indicating vehicle operating conditions such as a vehicle speed pulse signal $S_v$ from a speed sensor, a fuel voltage signal $S_f$ from a fuel sensor indicating the amount of remaining fuel, and a washer liquid L/H level voltage signal $S_w$ from a washer liquid sensor where the detected voltage level is changed from "H" to "L" when the level of the washer liquid decreases below a predetermined level. One of these signals $S_v$, $S_f$, and $S_w$ is selectively output to the next stage when any of the points a, b, and c connected to the control terminals of the multiplexer 1 is turned to a ground level by depressing any of the switches 2, 4, and 5.

In more detail, the numeral 2 denotes an ignition switch to output the washer liquid signal $S_w$ from the multiplexer 1 in such a way that when the switch 2 is turned on, a current flows from a battery B to a coil $3a$ of a relay 3 to open a normally-closed contact $3b$ and when turned off, the current is cut off to close the contact $3b$, namely, to ground the point a. Further, in this case, the washer liquid signal is held for a while by a condenser C after the ignition switch 2 has been turned off.

The switch 4 is a trip switch to output the speed signal $S_v$ from the multiplexer 1 by changing the point b to the ground level when turned on. And, also, the switch 5 is a fuel switch to output the fuel signal $S_f$ from the multiplexer 1 by changing the point c to the ground level when turned on.

When outputted from the multiplexer 1, the vehicle speed signal $S_v$ is divided by a divider 6, counted by a counter 7, and stored as the information of distance traveled in a holding circuit 9 every time the number counted by the counter 7 reaches a predetermined value (for example, corresponding to traveling a distance of 5 km).

When outputted from the multiplexer 1, the fuel signal $S_f$ is converted into a pulse signal of a frequency corresponding to the voltage by a V-F converter 8, counted for a given period by the counter 7, and held in the holding circuit 9 as the information of the amount of remaining fuel.

On the other hand, the washer signal $S_w$ is directly output to the next stage.

The numeral 10 denotes a voice selector, which inputs a signal d held in the holding circuit 9 or the washer signal $S_w$ (L/H level signal) as the data signal when any of the ignition switch 2, trip switch 4, and fuel switch 5 is turned on to ground one of the points a, b, and c, next selects a voice designation signal $D_s$ for voice information, for example, such as "Replenish washer liquid", or "Fuel tank is now half full", which are previously stored in a voice output unit 14 in accordance with the signal d or $S_w$, in the form of a binary digit code (address signal). Further, when the voice designation signal $D_s$ is outputted, a gate control signal $S_g$ is also outputted from the voice selector 10 to a gate circuit 12 to open the gate circuit 12.

The numeral 13 is a repeat switch. If this repeat switch 13 is off, since the potential of the repeat signal $S_r$ rises to a "H" level because of a battery potential B through a resister R, the gate circuit 12 is kept closed. However, once this repeat switch is turned on, since the potential drops to a "L" level, the gate circuit 12 is opened to feed a voice designation signal $D_s$ stored in the memory 11 to the voice output unit 14.

In the voice memory 11, necessary voice information is stored in units of sentences, phrases, words, or phones and is output as a series of voice signals $V_s$ after selection in accordance with the voice output designation signal $D_s$ outputted from the voice output selector 10. The voice signal $V_s$ outputted from the voice output unit 14 is amplified through an amplifier 15, and voice warning information is indicated to the driver through a separate speaker 16 or one of speakers used with the car radio.

In the voice output unit 14, in the case where the number of different items of information to be noticed is small, it is possible to record the necessary voice information on different tracks of an endless tape, select the track on which the required information is recorded in accordance with the voice output designation signal $D_s$, and reproduce the warning through a speaker.

However, in the case where the number of different items of information is large or the information varies, since a voice reproducing device using a magnetic recording medium may become excessively bulky and the access time also may be long, it is difficult to change the information freely. Therefore, in this case, it is very convenient to use a synthesizer using a linear prediction coding system which has recently put on the market by the Texas Instruments Incorporated in the USA, as explained in the second embodiment.

Figure 2:
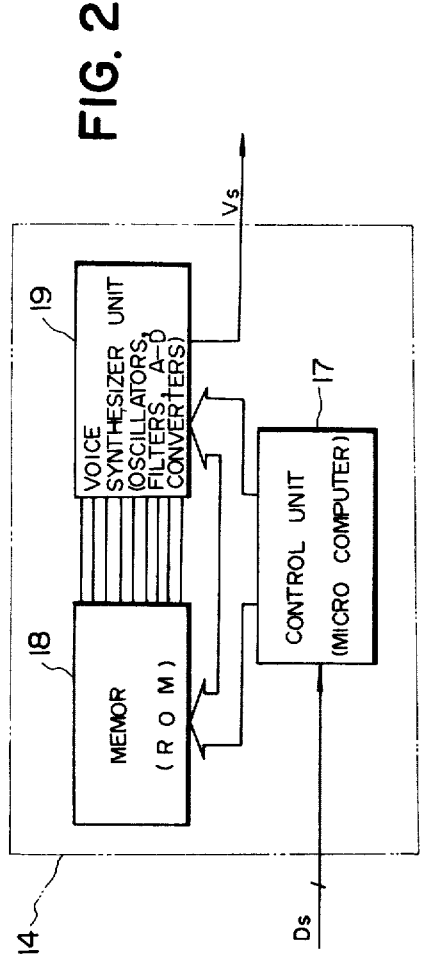
FIG. 2 is a schematic block diagram of a voice synthesizer used with the present invention.
Figure 3:
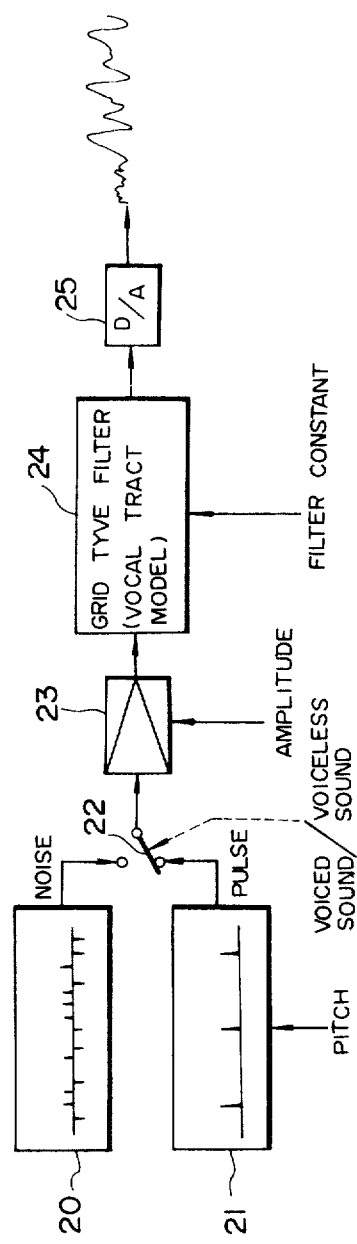
FIG. 3 is a schematic block diagram of assistance in explaining the theory of operation of a voice synthesizer using a linear prediction coding system.

Reference is now made to FIGS. 2 and 3, wherein a voice synthesizer (used as a voice output unit 14 in FIG. 1) is schematically illustrated.

The numeral 14 denotes a voice synthesizer using a linear prediction coding (LPC) system including three LSI units, a memory unit (ROM) 18, a voice synthesizer unit 19 (socillators, filters, and D-A converters), and a control unit or microcomputer 17, which corresponds to the voice output unit 14 in FIG. 1. This control unit 17 is a microcomputer comprising a CPU for controlling all the operations, a memory (ROM) for storing programs and fixed data, a memory (ROM) for storing input/output data, a clock oscillator, etc., which can implement all the operations.

As is well known in the art, a voice synthesizer based on the LPC system has recently been put on the market at a reasonable price. FIG. 4 shows schematically the principle of operation of this voice synthesizer.

In this synthesizer, pseudo-random noise signals N generated from the first sound source oscillator (white noise generator) 20 are selected by a switch 22 to produce voiceless sounds, and periodic impulse signals P generated from the second oscillator (impulse generator) 21 are selected by the switch 22 to produce voiced sounds. After being amplified by an amplifier 23, these signals N and P are formed into a voice sound by a grid-type filter 24 where the resonance characteristics of the human vocal tract (vocal organs such as tongue and lips located above the vocal chords) in speaking are modeled, and are outputted as a synthesized voice signal after conversion into an analog signal through a D-A converter 25.

The different values of constants such as the pitch of the periodic impulse signal, the distinction between voiced and voiceless sounds, the ratio of the amplification of the amplifier 23, and the filter constant of the grid-type filter 24, are stored in the memory unit (ROM) 18 of FIG. 2.

The voice synthesizer unit 19 comprises various circuits which correspond to a first sound source oscillator 20, a second sound source oscillator 21, a switch 22, an amplifier 23, a grid-type filter 24, a D-A converter 25 so that the synthesized voice sound signal $V_s$ necessary for warning information can be output after being controlled according to the output signal selected by the control unit 17.

As described above, according to the embodiment, if the trip switch 4 is kept turned on, a voice message according to the trip distance is selected through the voice selector 10 whenever the vehicle travels a given distance (e.g. 0.5 km); a voice output designation signal $D_s$ is outputted from the voice selector 10 and is stored in the memory 11 temporarily; the gate circuit 12 is opened by the gate control signal $S_g$ to feed the signal $D_s$ to the voice output unit 14; a voice signal $V_s$ to output the designated voice information is reproduced or synthesized; a trip message such as "Trip distance is 10 km" is indicated to the driver through the speaker 16 after amplified through the amplifier 15.

In the same way as the above, if the fuel switch 5 is kept turned on, a voice message to indicate the remaining fuel information is produced whenever a predetermined amount of fuel is consumed. Further, in this case, if the ignition switch 2 is turned off, a voice message is produced when the washer liquid level drops below a predetermined level.

In case the driver fails to notice or cannot hear the voice message, the same voice information is produced again when the repeat switch 13 is turned on, since the repeat signal $S_R$ drops to a "L" level to open the gate 12 and the voice designation signal $D_s$ stored in the memory 11 is inputted to the voice output unit 14 to produce the voice information through the speaker 16. In addition, it is of course possible to inform the driver of various warning information on, for instance, vehicle speed, fuel consumption rate, coolant level, battery liquid level and so on.

As described above, according to the present invention, in case the driver fails to notice or cannot hear the information, the driver can hear the information again by operating the repeat switch.

It will be understood by those skilled in the art that the foregoing description is in terms of a preferred embodiment of the present invention wherein various changes and modifications may be made without departing from the spirit and scope of the invention, which is to be defined by the appended claims.

What is claimed is:

1. A voice warning system for an automotive vehicle, which comprises:
   (a) a voice warning apparatus comprising:
   (1) a plurality of sensors for detecting various vehicle operating conditions;

(2) a plurality of information switches for obtaining signals from said sensors;

(3) a multiplexer for selectively outputting one of various signals indicating vehicle operating conditions when one of said switches is depressed;

(4) a voice selector for outputting a voice output designation signal $D_s$ and a gate control signal $S_g$ in accordance with the signal from said multiplexer;

(5) a voice output unit for storing a number of voice outputs and for outputting a series of voice signals $V_s$ in response to the voice output designation signal $D_s$ from said output selector.

(b) a memory for storing temporarily the voice output designation signals $D_s$, being disposed after said voice selector 10, (c) a repeat switch for outputting a repeat signal $S_r$ to said voice selector; and (d) a gate circuit for outputting the designation signal $D_s$ stored in said memory to said voice output unit in response to the signal $S_g$ from said voice selector or the signal $S_r$ from said repeat switch, whereby voice warning information is indicated to the driver repeatedly, whenever said repeat switch is depressed.

2. A voice warning system for an automotive vehicle as set forth in claim 1, wherein said voice output unit is an LPC voice synthesizer comprising:

(1) a voice synthesizer unit having a first sound source oscillator for generating pseudo-random noise signals N, a second sound source oscillator for generating periodic impulse signals P, a grid-type filter of vocal tract model, and a D-A converter for converting the digital voice signal to an analog voice signal, (2) a memory unit (ROM) for storing voices synthesized by said voice synthesizer;

(3) a control unit formed by a microcomputer having a CPU, a read only memory for storing programs and fixed data, a random access memory, and a clock oscillator, for controlling input/output of the various signals and for producing different items of voice information through said synthesizer unit.

* * * * *